Dec. 30, 1952        J. BRAUKUS        2,623,321
PROTECTOR FOR FISHHOOKS
Filed Aug. 10, 1951
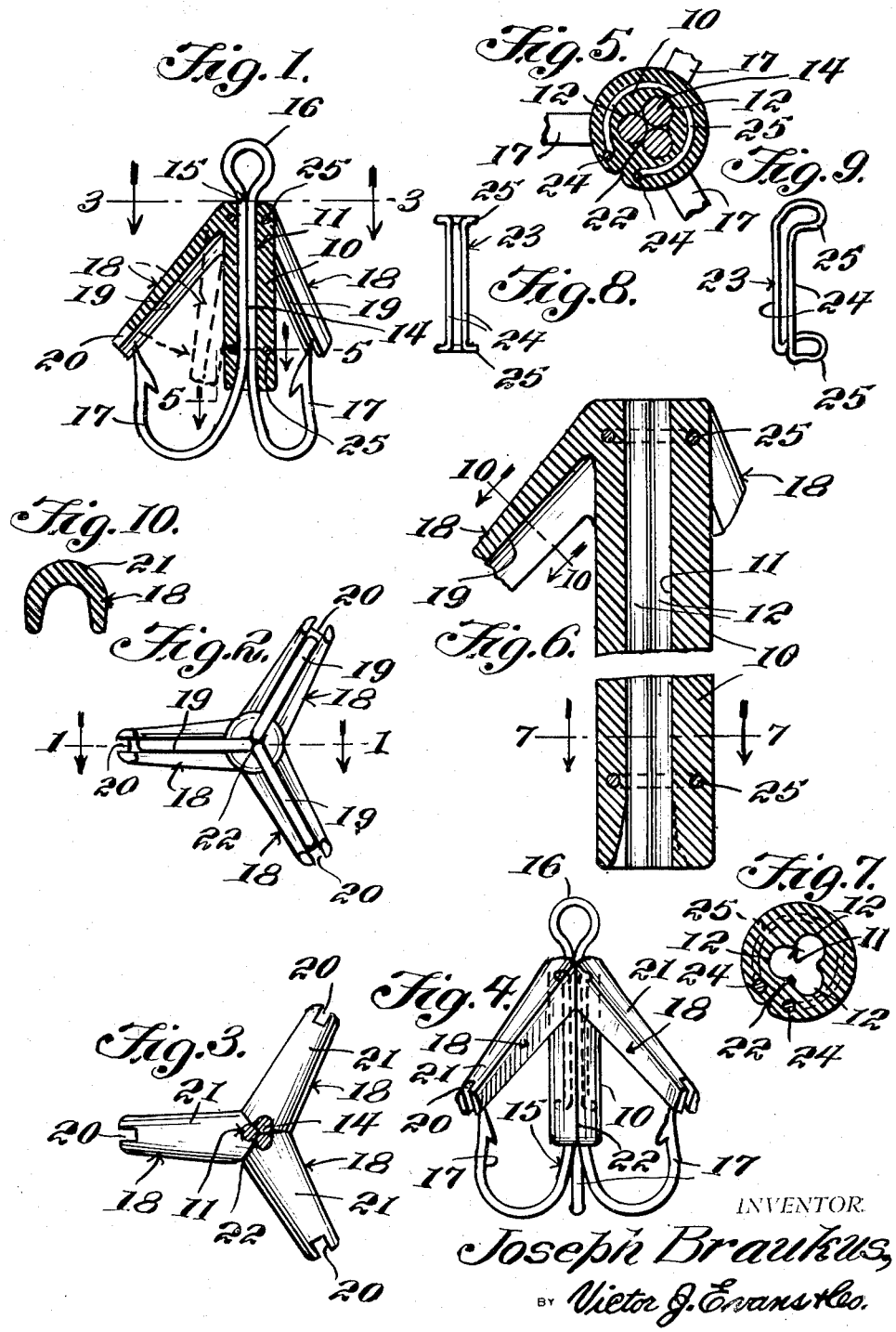
INVENTOR.
Joseph Braukus,
BY Victor J. Evans & Co.
ATTORNEYS Patented Dec. 30, 1952

2,623,321

UNITED STATES PATENT OFFICE 2,623,321

PROTECTOR FOR FISHHOOKS

Joseph Braukus, Wallace, Idaho

Application August 10, 1951, Serial No. 241,233

1 Claim. (Cl. 43—43.4)

This invention relates to fishing equipment, and more particularly to a protector for fishhooks.

The object of the invention is to provide a device for protecting or preventing weeds from becoming entangled in fishhooks, such as fishhooks having three barbs or prongs, the device of the present invention being readily attachable to or removed from the fishhook as desired.

Another object of the invention is to provide a fishhook protector which is made of flexible material, such as rubber, there being a spring member for preventing the protector of the present invention from becoming accidentally detached from the fishhook, the device being constructed so that there will be no interference with normal use of the fishhook, so that a fish can be readily caught on the hook.

A further object of the invention is to provide a fishhook protector which is extremely simple and inexpensive to manufacture.

Other objects and advantages will be apparent during the course of the following description.

In the accompanying drawings forming a part of this application, and in which like numerals are used to designate like parts throughout the same:

Figure 1 is a sectional view taken on the line 1—1 of Figure 2;

Figure 2 is a bottom plan view of the fishhook protector of the present invention;

Figure 3 is a sectional view taken on the line 3—3 of Figure 1;

Figure 4 is a side elevational view of the protector attached to a fishhook;

Figure 5 is a sectional view taken on the line 5—5 of Figure 1;

Figure 6 is an enlarged longitudinal sectional view taken through the fishhook protector of the present invention;

Figure 7 is a sectional view taken on the line 7—7 of Figure 6;

Figure 8 is a side elevational view of the spring member;

Figure 9 is a perspective view of the spring member;

Figure 10 is a sectional view taken on the line 10—10 of Figure 6.

Referring in detail to the drawings, the numeral 10 designates the body member of the fishhook protector, and the fishhook protector of the present invention may be made of any suitable flexible material, such as rubber. The fishhook protector of the present invention is adapted to be readily mounted on or attached to a conventional three-pronged or three-barbed fishhook 15, whereby weeds or other obstructions will not become entangled in the barbs 17 when the fisherman is using his equipment.

The body member 10 is provided with a longitudinally extending bore 11 which is adapted to receive therein the shank 14 of the fishhook 15. The fishhook 15 also includes a loop portion 16 which is adapted to be attached to the conventional fishing line. As shown in Figure 7, the bore 11 is provided with three longitudinally extending recesses or indentations 12 which are each adapted to receive therein a strand of the shank 14.

Formed integrally with the body member 10, or secured thereto is a plurality of inclined or tapered arms 18, and the arms 18 are also made of flexible material, such as rubber. The arms 18 are adapted to move toward and away from the body member 10. Thus, the arms 18 move from the solid line position shown in Figure 1 to the dotted line position, so that when a fish is being caught, there will be no interference therewith. Each of the arms 18 has its under surface provided with a longitudinally extending recess or groove 19, whereby when the arms 18 are moved inwardly against the body member 10, the arms 18 will snugly embrace or engage the exterior surface of the body member 10, so that there will be no interference with the hook 17. Also, the outer end of each of the arms 18 is provided with a notch or slot 20, Figure 1, whereby there will be no interference with the swinging movement of the arms 18. Thus, the notches 20 permit the arms 18 to readily swing past the projecting ends of the hooks 17. The outer surfaces of the arms 18 are arcuate or curved, as at 21, Figure 10, whereby frictional resistance will be maintained at a minimum when the fishhook with the device is being pulled through the water. The body member 10 is provided with a longitudinally extending slit 22, Figure 7, whereby the body member can be readily snapped over the shank 14 of the fishhook 15.

A means is provided for preventing the device of the present invention from becoming accidentally detached from the fishhook 15. This means comprises a spring member 23 which is shown in detail in Figures 8 and 9. The spring member 23 may be made of any suitable material, such as wire having a certain degree of resiliency, and the spring member 23 includes a pair of spaced, parallel legs 24. The ends of the legs 24 are connected together by arcuate sections 25. During the molding or fabricating of the protector device of the present invention, the spring member 23 may be embedded in the body member 10. It will be seen from the drawings that the legs 24 of the spring member 23 are arranged on opposite sides of the slit 22 and also the arcuate sections 25 are positioned at opposite ends of the body member 10. Thus, when the body member 10 is to be snapped on the shank 14, the resiliency of the spring member 23 and the body member 10 will permit the slit 22 to be spread apart or opened wider, so that the device can be snapped in place.

In use, the body member 10 may be readily snapped on the shank 14 by manually spreading apart the portions of the body member 10 which are arranged contiguous to the slit 22. In other words, the shank 14 of the fishhook 15 will pass through the slit 22 and seat in the bore 11, the arcuate portions 12 receiving therein the strands of the shank 14, as shown in Figure 5. The fishhook 15 can be readily attached to a fishing line by means of the loop 16, and the arms 18 will normally remain in the position shown in solid lines in the drawings. Thus, weeds and the like will not become entangled in the hooked end 17 of the fishhook, and since there are three of the arms 18 provided, there will be protection for each of the hooks 17 of the three-pronged fishhook 15. The notches 20 provide sufficient clearance for the arms 18 to pivot or swing inwardly against the body member 10, as when a fish is to be caught on the hook end 17. Also, the recesses 19 enable the arms 18 to snugly engage the exterior surface of the body member, so that there will be sufficient space provided for the fish to catch onto the hook end 17. Further, the spring member 23 will serve to insure that the body member will not become accidentally disengaged from the fishhook 15.

The arms 18 may be formed integrally with the body member 10, and it will be noted that the ends of the arms 18 are flush with the end of the body member 10. The device of the present invention can be detached or removed when desired, and can be made of any flexible or elastic material, the device of the present invention being especially adapted to be used on triple hooks. The construction of the arms 18 provides great rigidity or strength, but the arms are sufficiently resilient that when the fish strikes, the arms will swing out of the way to allow plenty of room for the fish to become hooked.

What is claimed is:

As a new article of manufacture, a fishhook protector fabricated of a piece of flexible material and shaped to define a body member provided with a longitudinally extending bore for receiving therein the shank of a fishhook, said body member being provided with a longitudinally extending slit, said bore including a plurality of longitudinally extending spaced parallel arcuate recesses, a plurality of inclined radially extending arms each having one end extending from said body member and being provided in its under face with a longitudinally extending recess, said arms being mounted for movement toward and away from said body member, there being a notch arranged in the free end of each of said arms and extending therealong for a portion of its length, and a spring member embedded in said body member and act to maintain said body member attached to the shank of the hook, said spring member comprising a pair of spaced parallel legs extending longitudinally in said body member, and having arcuate sections connecting the ends of said legs.

JOSEPH BRAUKUS.

REFERENCES CITED

The following references are of record in the file of this patent:

UNITED STATES PATENTS

| Number | Name | Date |
|---|---|---|
| 539,149 | Shattuck | May 14, 1895 |
| 755,677 | Krus | Mar. 29, 1904 |
| 789,241 | Staples | May 9, 1905 |
| 1,457,926 | Dunkelberger | June 5, 1923 |
| 2,185,507 | Knapp | Jan. 2, 1940 |
| 2,332,400 | Richardson | Oct. 19, 1943 |
| 2,482,881 | Sonner, Jr. | Sept. 27, 1949 |
| 2,522,292 | Modesto | Sept. 12, 1950 |